United States Patent
Viswanathan et al.

(10) Patent No.: US 6,543,012 B1
(45) Date of Patent: Apr. 1, 2003

(54) METHOD OF DETECTING INCORRECT SEQUENCES OF CODE EXECUTION

(75) Inventors: Dhiwakar Viswanathan, Prospect Adelaide (AU); Dipendra Chowdhary, Magill (AU)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/551,382

(22) Filed: Apr. 18, 2000

(30) Foreign Application Priority Data

Apr. 19, 1999 (AU) .......................................... 23844/99

(51) Int. Cl.[7] ................................. G06F 11/30
(52) U.S. Cl. ........................... 714/50; 714/51; 714/49; 717/126; 717/127
(58) Field of Search ............................. 714/49, 51, 50, 714/38; 712/227; 717/124, 126, 127

(56) References Cited

U.S. PATENT DOCUMENTS

| | | | | |
|---|---|---|---|---|
| 4,074,229 A | * | 2/1978 | Prey | 712/227 |
| 4,571,677 A | * | 2/1986 | Hirayama et al. | 714/49 |
| 4,864,569 A | * | 9/1989 | DeLucia et al. | 714/38 |
| 5,278,840 A | * | 1/1994 | Cutler et al. | 714/25 |
| 5,341,497 A | * | 8/1994 | Younger | 714/51 |
| 5,455,949 A | * | 10/1995 | Conder et al. | 712/234 |
| 5,463,745 A | * | 10/1995 | Vidwans et al. | 714/51 |
| 5,751,985 A | * | 5/1998 | Shen et al. | 717/126 |
| 5,758,060 A | * | 5/1998 | Little et al. | 714/52 |
| 5,974,529 A | * | 10/1999 | Zumkehr et al. | 712/41 |
| 5,996,092 A | * | 11/1999 | Augsburg et al. | 714/38 |
| 5,999,731 A | * | 12/1999 | Yellin et al. | 714/51 |
| 6,044,458 A | * | 3/2000 | Rinkenberger et al. | 712/243 |
| 6,055,650 A | * | 4/2000 | Christie | 714/39 |
| 6,157,999 A | * | 12/2000 | Rossbach et al. | 714/45 |
| 6,243,837 B1 | * | 6/2001 | Zimmermann et al. | 712/41 |
| 6,253,338 B1 | * | 6/2001 | Smolders | 714/51 |
| 6,269,478 B1 | * | 7/2001 | Lautenbach-Lampe et al. | 717/127 |
| 6,351,844 B1 | * | 2/2002 | Bala | 717/128 |
| 6,353,896 B1 | * | 3/2002 | Holzmann et al. | 714/38 |
| 6,378,064 B1 | * | 4/2002 | Edwards et al. | 712/227 |

OTHER PUBLICATIONS

Hetzel, Bill, "The Complete Guide to Software Testing–Second Edition", 1988, John Wiley & Sons, pp.201–202.*
Marick, Brian, "The Craft of Software Testing", 1995 Prenctice Hall PTR, pp. 435–437.*

* cited by examiner

*Primary Examiner*—Scott Baderman
*Assistant Examiner*—Anne Damiano

(57) ABSTRACT

A method of detecting illegal execution of code sequences includes the steps of: setting an active identifier to a first sequence identifier of a first code sequence, executing at least part of the first code sequence, calling, from the first code sequence, a second code sequence having a second sequence identifier, providing (20) a caller sequence identifier and a callee sequence identifier, checking (21) whether the callee sequence identifier is the same as the second sequence identifier, checking (23) whether the caller sequence identifier is the same as the active identifier, and generating (27) an alarm signal if either of the checks provide incorrect results.

9 Claims, 4 Drawing Sheets

METHOD OF DETECTING INCORRECT SEQUENCES OF CODE EXECUTION

FIELD OF THE INVENTION

This invention relates to a method of detecting incorrect sequences of code execution, and more particularly, to detecting execution of sequences of program code in a processor in an incorrect order.

BACKGROUND OF THE INVENTION

As is known, many computer programs have subroutines, or sequences of code, embedded therein, which are not necessarily provided at the point of the program where they are to be executed and which may need to be executed several times over the course of execution of the complete program. Thus, there may well be routines or subroutines, (hereinafter called "code sequences") which need to be called to by the code sequence being executed, with, in some cases, subroutines calling other subroutines in a stacked fashion.

When the processor system executing the program is subjected to environmental stress, such as electromagnetic radiation, while it is in operation, the contents of the program counter, or stack pointer, which tracks which subroutines are being called, can become altered. This changes the normal sequence of execution and the behaviour of the system becomes unpredictable. Software errors can have the same result.

If an incorrect sequence of code execution continues after such an alteration or error, without detection, it might allow the system to perform sensitive operations that could compromise the security of the system. This is undesirable in many cases, especially, for example, in smartcards, where the cryptographic keys might be modified unintentionally.

Many methods of detecting such incorrect sequences of code execution are known, but most, if not all, have deficiencies in certain circumstances, or require a large amount of computational resources, which may be unavailable in some applications, for example smartcards.

BRIEF SUMMARY OF THE INVENTION

The present invention therefore seeks to provide a method of detecting incorrect sequences of code execution which overcomes, or at least reduces the above-mentioned problems of the prior art.

Accordingly, the invention provides a method of detecting illegal execution of code sequences, the method comprising the steps of: a) setting an active identifier to a first sequence identifier of a first code sequence; b) executing at least part of the first code sequence; c) calling, from the first code sequence, a second code sequence-having a second sequence identifier; d) providing, to the second code sequence, a caller sequence identifier and a callee sequence identifier; e) checking, in the second code sequence, whether the callee sequence identifier is the same as the second sequence identifier; f) checking, in the second code sequence, whether the caller sequence identifier is the same as the active identifier; and g) generating a signal when either of steps (e) or (f) provide incorrect results.

BRIEF DESCRIPTION OF THE DRAWINGS

One embodiment of the invention will now be more fully described, by way of example, with reference to the drawings, of which.

DETAILED DESCRIPTION OF THE DRAWINGS

In the following description, reference will be made to a number of different types of subroutine, or code sequences. Firstly, an intermediate code sequence is defined as a code sequence which calls one or more other code sequences during its execution. Secondly, a terminating code sequence is defined as a code sequence which does not call any other code sequence during its execution. Thirdly, a code sequence identifier this_procedure_id is defined as a constant value which is unique to a particular code sequence. No two code sequences in a program can have the same code sequence identifier. The identifier of the code sequence which calls another code sequence is thus known as a caller identifier caller_id and the identifier of the code sequence which is being called is known as the callee identifier callee_id. Finally, an active identifier active_id is defined as a variable value which can be set to the identifier of the calling code sequence, i.e., the caller identifier.

Figure 1:
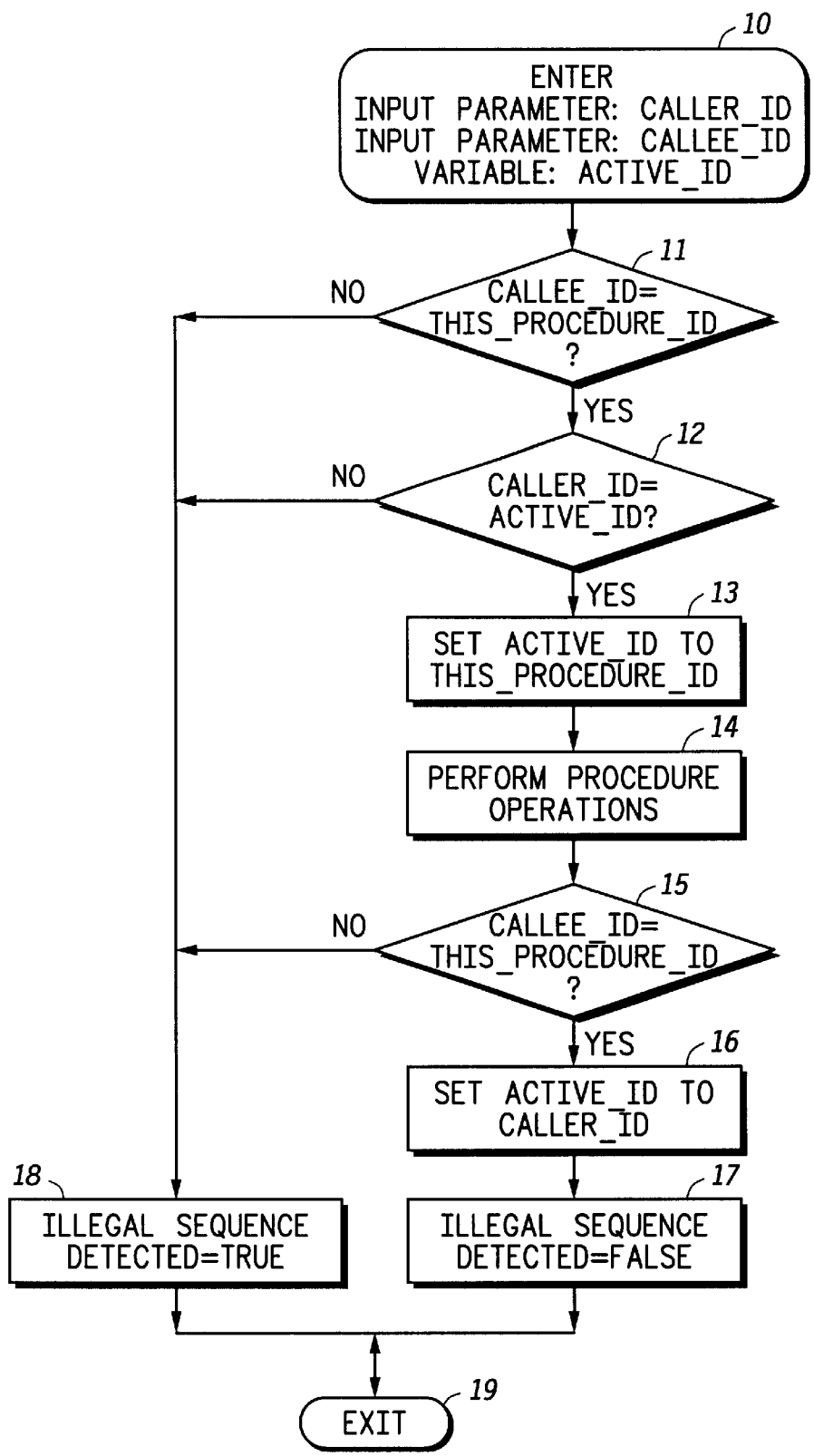
FIG. 1 shows a flow chart illustrating steps to detect an incorrect sequence of execution for a node procedure.

FIG. 1 shows a flow chart for an intermediate code sequence showing the steps which need to be performed to detect an illegal sequence in its execution. The starting point for this flow chart assumes that the intermediate code sequence is about to be executed by the processor. Control will stay in this flow chart 1 until the end of the intermediate code sequence. At the starting step 10, which the process flow enters, inputs to the intermediate code sequence are procedure specific parameters required for the particular intermediate code sequence and the active identifier active_id, which, as mentioned above, is a variable. Other parameters that are provided, apart from the procedure specific ones are the caller identifier caller_id and the callee identifier callee_id. The caller identifier caller_id contains the code sequence identifier of the code sequence that called this intermediate code sequence and the callee identifier callee_id contains the code sequence identifier of the code sequence being called. The active identifier active_id contains the code sequence identifier of the calling code sequence.

In the first decision block 11, a test is made to see whether the callee identifier callee_id provided to this intermediate code sequence and this intermediate code sequence's identifier this_procedure_id are the same. If they are not the same, then it is clear that there has been an error in calling the intermediate code sequence and the process flow moves to step 18. If they are the same, then the process flow moves to step 12, where a test is made to see whether the caller identifier caller_id and the active identifier active_id are the same. If they are not the same, then again it is clear that the calling code sequence is not the same as the code sequence that is supposed to be presently active and therefore a fault is detected and the process flow moves to step 18. If they are the same, then the process flow moves from step 12 to step 13, where the active identifier active_id is set equal to this intermediate code sequence's identifier this_procedure_id.

The process flow then moves to step 14, where this intermediate code sequence's procedures are executed. This can include calling further code sequences, since the active identifier active_id has already been set equal to this intermediate code sequence's identifier this_procedure_id.

Then, in step 15, a further test is made to see whether the callee identifier callee_id and this intermediate code sequence's identifier this_procedure_id are the same. If they are not the same, then the process flow moves to step 18. If they are the same, then, in step 16, the active identifier active_id is set back equal to the caller identifier caller_id of the code sequence that called this intermediate code sequence. Thus, if any of the tests in steps 11, 12 or 15 failed, then, in step 18, information that an illegal sequence has been detected is produced and a detection signal can be generated, which can be an alarm signal to halt the execution process. If, however, none of the tests failed, then, as indicated in step 17, it is not true that an illegal sequence has been detected and the process flow then exits at step 19 from either step 17 or step 18. The process flow can then return to the code sequence that called this intermediate code sequence in a correct manner, with the active identifier being correct for that calling code sequence.

It should be noted that the tests of steps 11 and 12 are performed at least near the beginning of the intermediate code sequence. Setting the active identifier in step 13 is performed near the beginning of the intermediate code sequence. The test in step 15 is performed at least towards the end of the intermediate code sequence and restoration of the active identifier in step 16 is performed towards the end of the intermediate code sequence.

Figure 2:
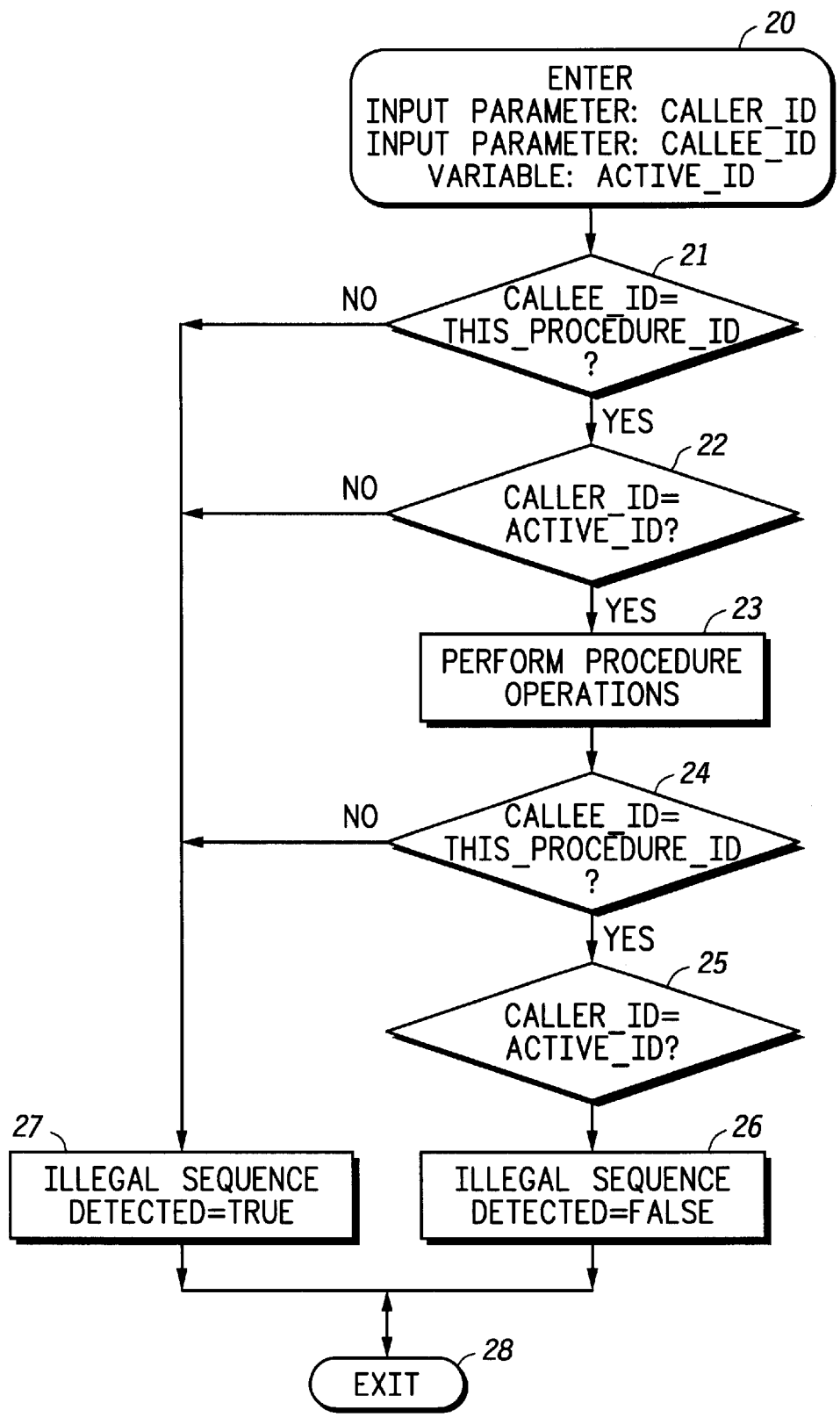
FIG. 2 shows a flow chart illustrating steps to detect an incorrect sequence of execution for a leaf procedure.

FIG. 2 shows a flow chart 2 for a terminating code sequence showing the steps which needs to be performed to detect the illegal sequences of its execution. The starting point for this flow chart 2 assumes that the terminating code sequence is about to be executed by the processor. Control will stay within this flow chart until the end of the terminating code sequence. At the starting step 20, which the process flow enters, inputs to the terminating code sequence are the procedure specific parameters required for the particular terminating code sequence and the active identifier active_id. Other parameters that are provided, apart from the procedure specific ones are the caller identifier caller_id and the callee identifier callee_id. As before, the active identifier active_id contains the identifier of the calling code sequence.

Similarly to the first decision block 11 of FIG. 1, in the first decision block 21, a test is made to see whether the callee identifier callee_id provided to this terminating code sequence and this terminating code sequence's identifier this_procedure_id are the same. If they are not the same, then it is clear that there has been an error in calling the terminating code sequence and the process flow moves to step 27. If they are the same, then the process flow moves to step 22, where a test is made to see whether the caller identifier caller_id and the active identifier active_id are the same, similarly to the test performed in step 12 of FIG. 1. If they are not the same, then again it is clear that the calling code sequence is not the same as the code sequence that is supposed to be presently active and therefore a fault is detected and the process flow moves to step 27. If they are the same, then the process flow moves to step 23, where this terminating code sequence's procedures are executed. Then, in steps 24 and 25, the tests performed in steps 21 and 22 to check whether is made to see whether callee identifier callee_id provided to this terminating code sequence and this terminating code sequence's identifier this_procedure_id are the same and whether the caller identifier caller_id and the active identifier active_id are the same are repeated. If either of these tests fail, then the process flow moves to step 27.

Thus, if any of the tests in steps 21, 22 or 24 failed, then, in step 27, information that an illegal sequence has been detected is produced and a detection signal can be generated, which can be an alarm signal to halt the execution process. If, however, none of the tests failed, then, as indicated in step 26, it is not true that an illegal sequence has been detected and the process flow then exits at step 28 from either step 26 or step 27. The process flow can then return to the code sequence that called this terminating code sequence.

In FIG. 2, the test performed in decision blocks 21 and 22 are performed at least near the beginning of the terminating code sequence and the tests performed in decision blocks 24 and 25 are performed at least towards the end of the terminating code sequence. The tests can, however, be repeated at other points during execution of the terminating code sequence.

It will be apparent that the tests performed near the beginning and towards the end of the intermediate code sequence in FIG. 1 and the terminating code sequence in FIG. 2 depend on the correct values of the caller identifier caller_id, callee identifier callee_id and the correct setting of the active identifier active_id. This means the above mentioned tests are satisfied only when the code sequence is called correctly from the correct location. This ensures that any illegal sequences of execution occurring within the code sequence are detected immediately.

Figure 3:
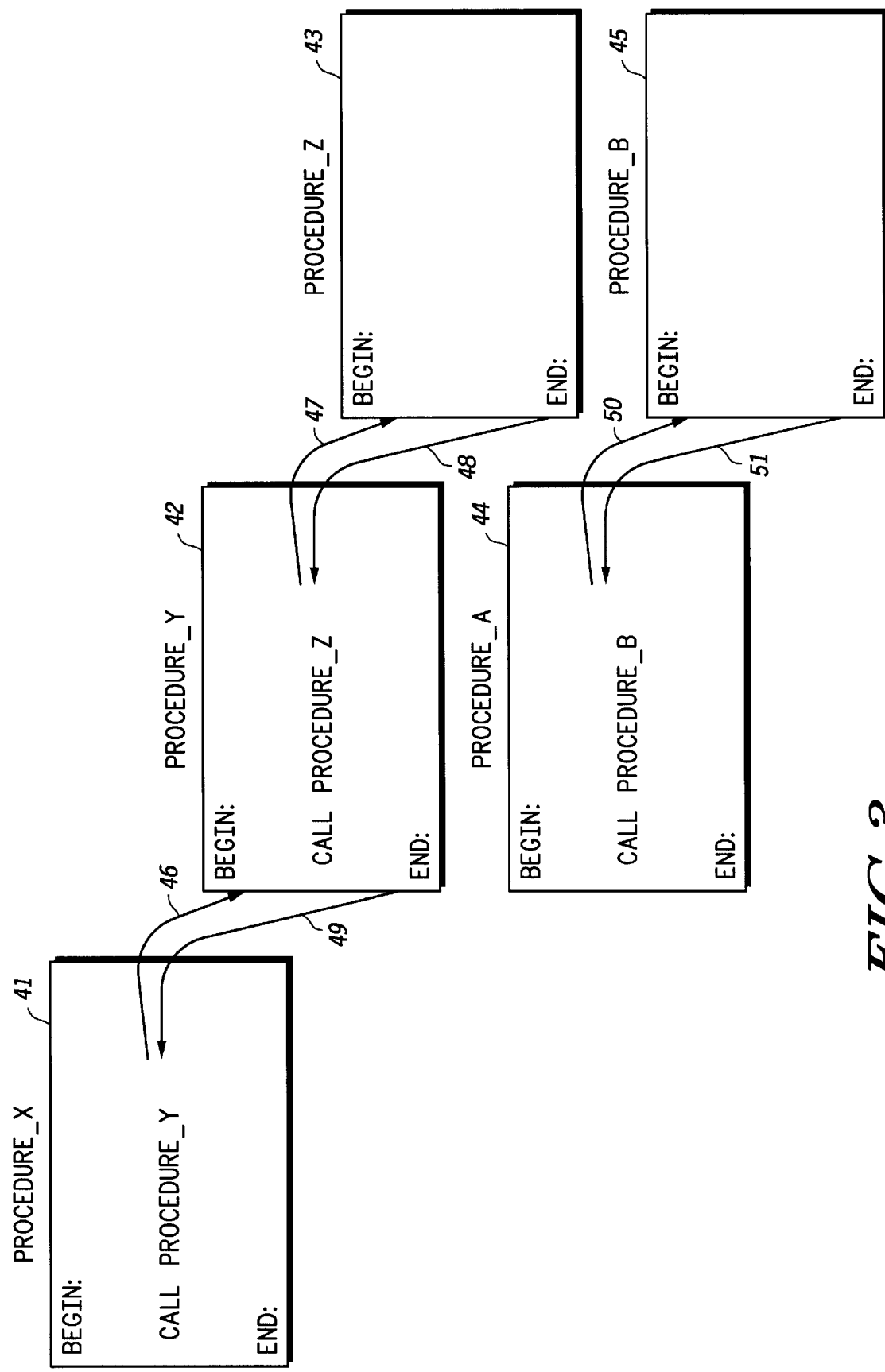
FIGS. 3 and 4 illustrate a scheme which detects an incorrect sequence of code execution.
Figure 4:
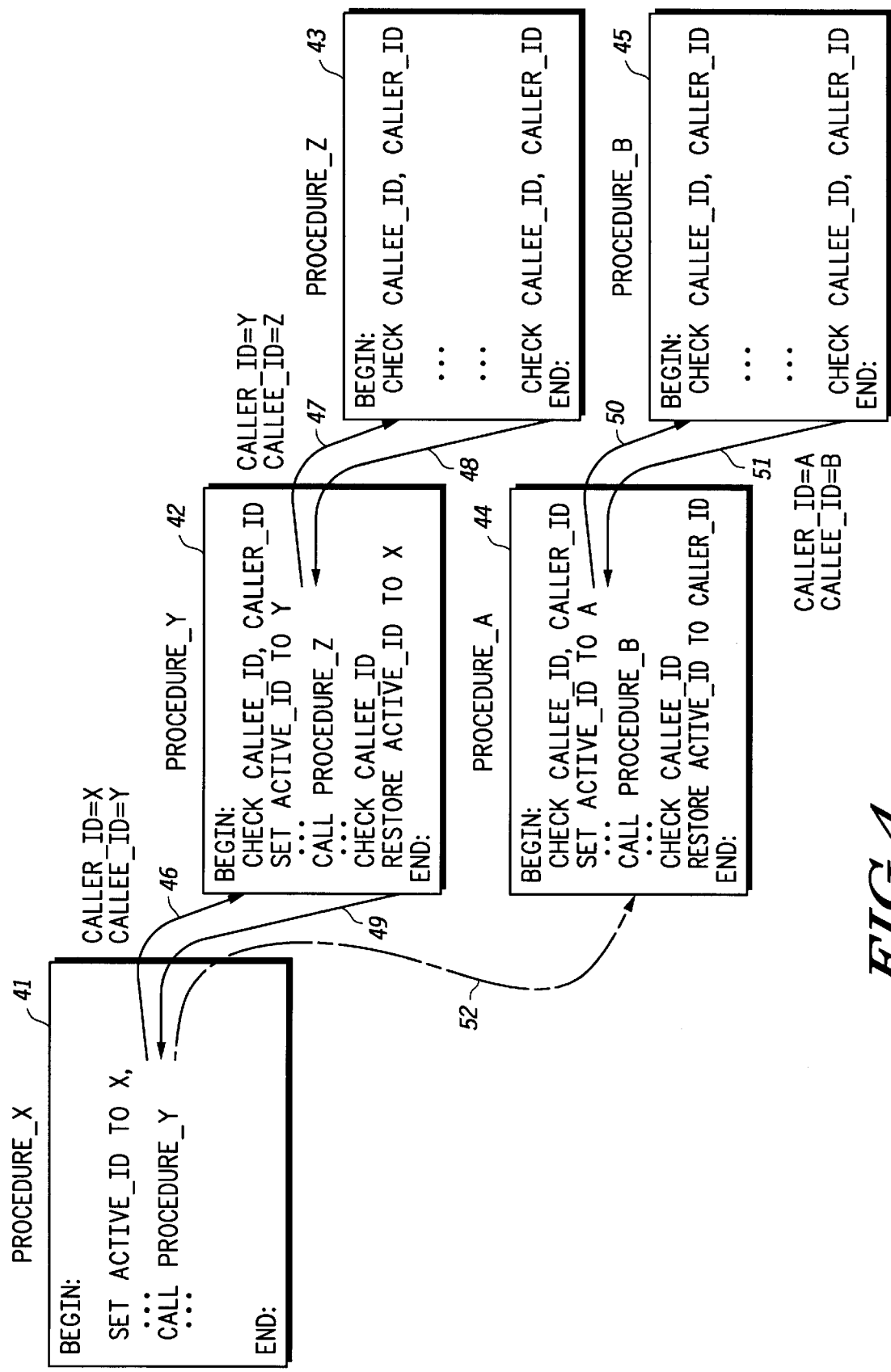

The scheme described above to detect the illegal sequences of code execution will now be further described with reference to FIGS. 3 and 4, which show a chain 40 of procedure calls in a typical program. In FIGS. 3 and 4, a calling code sequence Procedure_X is represented by block 41, an intermediate code sequence Procedure_Y is represented by block 42, and a terminating code sequence Procedure_Z is represented by block 43. A further intermediate code sequence Procedure_A is represented by block 44, and a further terminating code sequence Procedure_B is represented by block 45. The calling code sequence Procedure_X may, of course, itself be an intermediate code sequence. A valid sequence of calling and returning steps between blocks 41, 42 and 43 are shown by arrow 46 calling intermediate code sequence Procedure_Y from calling code sequence Procedure_X, arrow 47 calling terminating code sequence Procedure_Z from intermediate code sequence Procedure_Y, arrow 48 returning control of the process flow from terminating code sequence Procedure_Z to intermediate code sequence Procedure_Y and arrow 49 returning control of the process flow from intermediate code sequence Procedure_Y to calling code sequence Procedure_X. A valid sequence of calling and returning steps between blocks 44 and 45 are shown by arrow 50 calling terminating code sequence Procedure_B from intermediate code sequence Procedure_A and arrow 51 returning control of the process flow from terminating code sequence Procedure_B to intermediate code sequence Procedure_A.

FIG. 4 shows the chain of procedure calls shown in FIG. 3 with the inclusion of the steps mentioned above with reference to FIGS. 1 and 2 included within the blocks. Code sequence identifiers are also shown, together with the caller and callee identifiers being passed from one code sequence to the next in the chain, as described above.

However, FIG. 4 also shows an illegal sequence of procedure execution by arrow 52 moving the execution flow at some random time from calling code sequence Procedure_X to somewhere within intermediate code sequence Procedure_A, before it calls terminating code sequence Procedure_B. When this occurs, the variable active identifier active_id is set to the code sequence identifier of calling code sequence Procedure_X and not intermediate code sequence Procedure_A. As a result, the caller identifier check in terminating code sequence Procedure_B detects the illegal sequence of execution. It will be appreciated that wherever within intermediate code sequence Procedure_A the random, illegal, path shown by arrow 52 moves the process flow to, the tests to be carried out as described above will determine that an illegal execution of code sequences has been carried out and will generate an alarm signal accordingly.

It will be appreciated that although only one particular embodiment of the invention has been described in detail, various modifications and improvements can be made by a person skilled in the art without departing from the scope of the present invention.

What is claimed is:

1. A method of detecting illegal execution of code sequences, the method comprising the steps of:
   a) setting an active identifier to a first sequence identifier of a first code sequence;
   b) executing at least part of the first code sequence;
   c) calling, from the first code sequence, a second code sequence having a second sequence identifier;
   d) providing, to the second code sequence, a caller sequence identifier and a callee sequence identifier;
   e) checking, in the second code sequence, whether the callee sequence identifier is the same as the second sequence identifier;
   f) checking, in the second code sequence, whether the caller sequence identifier is the same as the active identifier; and
   g) generating a signal when either of steps (e) or (f) provide incorrect results.

2. A method of detecting illegal execution of code sequences according to claim 1, further comprising the steps of:
   h) executing the second code sequence, when no signal has been generated;
   i) repeating steps (e) to (g); and
   j) returning to the first code sequence, when no signal has been generated.

3. A method of detecting illegal execution of code sequences according to claim 1, further comprising, at any time during step (b), the steps of:
   k) calling a third code sequence having a third sequence identifier;
   l) providing, to the third code sequence, a caller sequence identifier and a callee sequence identifier;
   m) checking, in the third code sequence, whether the callee sequence identifier is the same as the third sequence identifier;
   n) checking, in the third code sequence, whether the caller sequence identifier is the same as the active identifier; and
   o) generating a signal when either of steps (m) or (n) provide incorrect results;
   p) setting the active identifier to the third sequence identifier;
   q) executing at least part of the third code sequence;
   r) calling, from the third code sequence, a further code sequence having a further sequence identifier;
   s) providing, to the further code sequence, a caller sequence identifier and a callee sequence identifier;
   t) checking, in the further code sequence, whether the callee sequence identifier is the same as the further sequence identifier;
   u) checking, in the further code sequence, whether the caller sequence identifier is the same as the active identifier; and
   v) generating a signal when either of steps (t) or (u) provide incorrect results;
   w) executing the further code sequence, when no signal has been generated;
   x) repeating steps (t) to (v);
   y) returning to the third code sequence, when no signal has been generated;
   z) repeating steps (m) and (o);
   aa) restoring the active identifier to the first sequence identifier; and
   ab) returning to the first code sequence, when no signal has been generated.

4. A method of detecting illegal execution of code sequences according to claim 1, wherein the signal generated in step (g) is an alarm signal.

5. A method of detecting illegal execution of code sequences according to claim 2, wherein steps (e) to (g) are repeated at least once more at some point during execution of the second code sequence.

6. A method of detecting illegal execution of code sequences according to claim 3, wherein steps (m) and (o) are repeated at least once more at some point during execution of the third code sequence.

7. A method of detecting illegal execution of code sequences according to claim 3, wherein steps (t) to (v) are repeated at least once more at some point during execution of the further code sequence.

8. A method of detecting illegal execution of code sequences according to claim 3, wherein the signal generated in step (o) is an alarm signal.

9. A method of detecting illegal execution of code sequences according to claim 3,
   wherein the signal generated in step (v) is an alarm signal.

* * * * *